US012808696B2

(12) United States Patent
DeWind

(10) Patent No.: US 12,808,696 B2
(45) Date of Patent: Nov. 24, 2026

(54) SINGLE CHANNEL OPTICAL COEFFICIENT DATA

(71) Applicant: Simmonds Precision Products, Inc., Vergennes, VT (US)

(72) Inventor: Eric M. DeWind, Richmond, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 128 days.

(21) Appl. No.: 18/244,582

(22) Filed: Sep. 11, 2023

(65) Prior Publication Data

US 2025/0085140 A1 Mar. 13, 2025

(51) Int. Cl.

*G01D 5/353* (2006.01)
*G01D 5/26* (2006.01)
*G01D 18/00* (2006.01)
*H04B 10/071* (2013.01)

(52) U.S. Cl.

CPC ......... *G01D 5/35316* (2013.01); *G01D 5/268* (2013.01); *G01D 5/35312* (2013.01); *G01D 18/00* (2013.01); *H04B 10/071* (2013.01)

(58) Field of Classification Search

CPC ........... G01D 5/35316; G01D 5/35312; G01D 18/00; G01D 5/268; H04B 10/071

See application file for complete search history.

(56) References Cited

U.S. PATENT DOCUMENTS

| | | | | |
|---|---|---|---|---|
| 7,027,136 B2 | 4/2006 | Tsai et al. | | |
| 7,433,551 B2 | 10/2008 | Poland et al. | | |
| 10,184,852 B2 | 1/2019 | Carr | | |
| 10,586,081 B2 | 3/2020 | Austerlitz et al. | | |
| 10,768,055 B2 | 9/2020 | Miller | | |
| 2004/0113055 A1* | 6/2004 | Whelan | G01B 11/18 | 250/227.18 |
| 2004/0113056 A1* | 6/2004 | Everall | H04B 10/071 | 374/E11.016 |

(Continued)

FOREIGN PATENT DOCUMENTS

WO 2022167786 A1 8/2022

OTHER PUBLICATIONS

Practical strain isolation in embedded fiber Bragg gratings; E Shafir et al.2005 Smart Mater. Struct. 14 N26 (Year: 2005).*

(Continued)

*Primary Examiner* — Tarifur R Chowdhury
*Assistant Examiner* — Kaitlyn E Kidwell
(74) *Attorney, Agent, or Firm* — Tucker Ellis LLP

(57) ABSTRACT

A system includes an illuminator. A first end of an optic fiber is operatively connected to the illuminator for transmitting illumination along the length of the optic fiber. An optical sensor operatively connected to the second end for reflecting sensor returns of the illumination back along the length of the optic fiber. A set of fiber Bragg grating (FBGs) is formed in the optic fiber between the first end and the optical sensor. A delay span is included in the optic fiber between the FBGs and the optical sensor. An interrogator is operatively connected to the first end to receive the sensor returns and the FBG returns from the optic fiber. The delay span has a length along the fiber that is configured to create a delay between when the interrogator receives the FBG returns and when the interrogator receives the sensor return.

19 Claims, 2 Drawing Sheets

(56) References Cited

U.S. PATENT DOCUMENTS

| | | | | |
|---|---|---|---|---|
| 2004/0202400 | A1* | 10/2004 | Kochergin | G02B 6/42 385/12 |
| 2007/0252998 | A1* | 11/2007 | Berthold | G01J 3/26 356/450 |
| 2014/0152995 | A1* | 6/2014 | Dong | G01D 5/35316 356/477 |
| 2016/0239464 | A1* | 8/2016 | Bessler | G06F 17/17 |
| 2019/0383664 | A1* | 12/2019 | O'Dowd | G01D 18/004 |
| 2021/0356300 | A1 | 11/2021 | Hooft et al. | |
| 2023/0075887 | A1* | 3/2023 | Oton | G01D 5/35316 |
| 2023/0104471 | A1* | 4/2023 | Moore | G01K 11/3206 73/800 |
| 2023/0349780 | A1* | 11/2023 | Cheng | G01D 5/268 |

OTHER PUBLICATIONS

Extended European Search Report dated Jan. 17, 2025, for European Patent Application No. 24199869.9, 10 pgs.

* cited by examiner

| | | Time | | | | | | | | | | |
|---|---|---|---|---|---|---|---|---|---|---|---|---|
| | | $t_0$ | $t_0+c$ | $t_0+2c$ | $t_0+\Delta T$ | $t_0+\Delta T+c$ | $t_0+\Delta T+2c$ | $t_0+2\Delta T$ | $t_0+2\Delta T+c$ | $t_0+2\Delta T+2c$ | $t_0+3\Delta T$ | |
| Reflection Type | Meas# | $M[t_0]$ | $M[t_0+c]$ | $M[t_0+2c]$ | $M[t_0+\Delta T]$ | $M[t_0+\Delta T+c]$ | $M[t_0+\Delta T+2c]$ | $M[t_0+2\Delta T]$ | $M[t_0+2\Delta T+c]$ | $M[t_0+2\Delta T+2c]$ | $M[t_0+3\Delta T]$ | Derived Measurement |
| FBG | 0 | | A | A | A | | | | | | | $M[t_0+c]$ |
| Optical Sensor | | | | | $B^*(1-A)^2$ | $B^*(1-A)^2$ | $B^*(1-A)^2$ | | | | | $M[t_0+\Delta T] / (1-FBG[0])^2 - FBG[0]$ |
| FBG | 1 | | | | | $A'$ | $A'$ | $A'$ | | | | $M[t_0+\Delta T+c]$ - OpticalSensor[0] |
| Optical Sensor | | | | | | | | $B'^*(1-A')^2$ | $B'^*(1-A')^2$ | $B'^*(1-A')^2$ | | $M[t_0+2\Delta T] / (1-FBG[1])^2 - FBG[1]$ |
| FBG | 2 | | | | | | | | $A''$ | $A''$ | $A''$ | $M[t_0+2\Delta T+c]$ - OpticalSensor[1] |
| Optical Sensor | | | | | | | | | | | $B''^*(1-A'')^2$ | $M[t_0+3\Delta T] / (1-FBG[2])^2 - FBG[2]$ |

FIG. 2

SINGLE CHANNEL OPTICAL COEFFICIENT DATA

BACKGROUND

The present disclosure relates to optical systems, and more particularly to optical sensors such as optical sensors utilizing Fabry-Perot cavity interferometry for mechanical strain, temperature and/or pressure measurements.

Fiber optic sensors (FOS) including, but not limited to fiber Bragg gratings (FBGs) and Fabry-Perot interferometers (FPIs) are used for many applications due to their small size, corrosion resistance, and immunity to electromagnetic interference. FOS can be used to sense numerous physical phenomena including temperature, strain, and pressure.

The response from the FOS to measurands depend on sensor construction. Even tight manufacturing tolerance specifications do not always allow for conversion into engineering units to the required accuracy. Therefore, separate coefficients for each sensor are required to convert optical signal indicators into useful engineering units. In some applications it may be sufficient to store the coefficients in a database in the optical interrogator system. However, this means updating the database when a FOS is added or replaced. This procedure is prone to error and in some cases, such as high design assurance aerospace applications, not always possible. Therefore encoding the coefficients with the sensor itself and having the optical interrogator system interpret and apply the coefficients has been a suggested solution. Additionally, to reduce hardware costs it is desirable for the coefficient data to be received using the same components as the optical sensor. However, with traditional techniques, it is difficult to sufficiently separate and reconstruct the coefficient data from the optical sensor reflections after they are combined.

The conventional techniques have been considered satisfactory for their intended purpose. However, there is an ever present need for improved systems and methods for encoding data into optical sensors and for reconstructing the data from the optical sensors. This disclosure provides a solution for this need.

SUMMARY

A system includes an illuminator and an optic fiber having a length between a first end of the optic fiber and a second end of the optic fiber. The first end is operatively connected to the illuminator for transmitting illumination along the length of the optic fiber. An optical sensor operatively connected to the second end for reflecting sensor returns of the illumination back along the length of the optic fiber. A set of fiber Bragg grating (FBGs) is formed in the optic fiber between the first end and the optical sensor. The FBGs are configured for reflecting FBG returns of the illumination back along the optic fiber to the first end. A delay span is included in the optic fiber between the FBGs and the optical sensor. An interrogator is operatively connected to the first end to receive the sensor returns and the FBG returns from the optic fiber. The delay span has a length along the fiber that is configured to create a delay between when the interrogator receives the FBG returns and when the interrogator receives the sensor return. The interrogator is configured to convert a combination of the FBG returns and the sensor returns into engineering units as output indicative of a measurement of a measurand at the optical sensor.

The interrogator can have a CPU with a speed and a clock cycle, wherein the speed of the CPU is inverse of the clock cycle. The delay span can have a length that is long enough to delay the sensor returns from the optical sensor to arrive at the interrogator after the FBG returns by at least a span of time of two times the clock cycle.

The optical sensor can include a Fabry-Perot interferometer. The illuminator can include a tunable laser. The interrogator can be operatively connected to the tunable laser to control the tunable laser to interrogate the optical sensor over a series of differing illumination wavelengths. The interrogator can be configured to receive the FBG returns and the sensor returns for each of the differing illumination wavelengths to form the engineering units as output. The engineering units can include mechanical strain, temperature and/or pressure.

The FBGs can be configured to include encoded data. The interrogator can be configured to decode the encoded data based on the FBG returns. The encoded data can include calibration coefficient data for the optical sensor. The interrogator can be configured to use the calibration coefficient data in converting the sensor returns into the engineering units. The interrogator can be configured to use the calibration coefficient data in converting the combination of the FBG returns and the sensor returns into the engineering units. The interrogator can be configured to perform a method for separating calibration coefficient data from optical sensor data. The method can include measuring the FBG returns arriving at the interrogator before the sensor returns due to the length the delay span, measuring a combination of the sensor returns and the FBG returns at some time after the measuring of the FBG returns arriving before the sensor returns, and correcting to isolate the sensor returns from the combination of the sensor returns and the FBG returns. The correcting can include using the measuring of the FBG returns arriving at the interrogator before the sensor returns to isolate the sensor returns.

The optic fiber can be connected to a single channel of the interrogator. Calibration coefficient data can be encoded in the FBGs whose reflections are separated in wavelength space. Spacings between consecutive FBGs in wavelength space can represent two ON bits separated by some number of OFF bits corresponding to the spacings. A single FBG of the FBGs can denote a start of encoding which allows a first bit to be an OFF bit. All the FBGs can be strain isolated and can be configured to be isothermal with one another.

A method includes illuminating a first end of an optic fiber, wherein illumination is first incident upon a set of fiber Bragg gratings (FBGs), then passes through a delay span of fiber, then reflects off of an optical sensor at a second end of the optic fiber. The method includes receiving an FBG return reflected from the FBGs at the first end of the optic fiver before arrival at the first end of a sensor return reflected from the optical sensor. The method includes receiving a combined return including the FBG return and the sensor return, converting a combination of the FBG returns and the sensor returns into engineering units indicative of a measurement of a measurand at the optical sensor, and outputting the engineering units.

The method can include controlling the tunable laser to interrogate the optical sensor over a series of differing illumination wavelengths, and receiving the FBG returns and the sensor returns for each of the differing illumination wavelengths to form the engineering units as output. The method can include decoding encoded data from the FBG returns to obtain the calibration coefficient data, and using the calibration coefficient data in converting the sensor returns into the engineering units. Using the calibration coefficient data can include using the calibration coefficient data in converting the combined return into the engineering units.

The method can include separating calibration coefficient data from optical sensor data. This can include measuring the FBG returns arriving at the first end of the fiber before the sensor returns due to the length the delay span, measuring a combination of the sensor returns and the FBG returns at some time after the measuring of the FBG returns that arrived before the sensor returns, and correcting to isolate the sensor returns from the combination of the sensor returns and the FBG returns. The correcting can include using the measuring of the FBG returns arriving at the interrogator before the sensor returns to isolate the sensor returns. The optic fiber can be connected to a single channel of an interrogator. The method can include using bits from the FBGs to derive one or multiple calibration coefficients. The method can include after interrogating the optical sensor for a series of differing wavelengths, resetting cumulative error by shutting off the laser for a sufficient time to clear the sensor returns and start interrogating the optical sensor for another series of differing wavelengths.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 2 shows FBG and optical sensor derivations over time for the system of FIG. 1.

DETAILED DESCRIPTION

Figure 1:
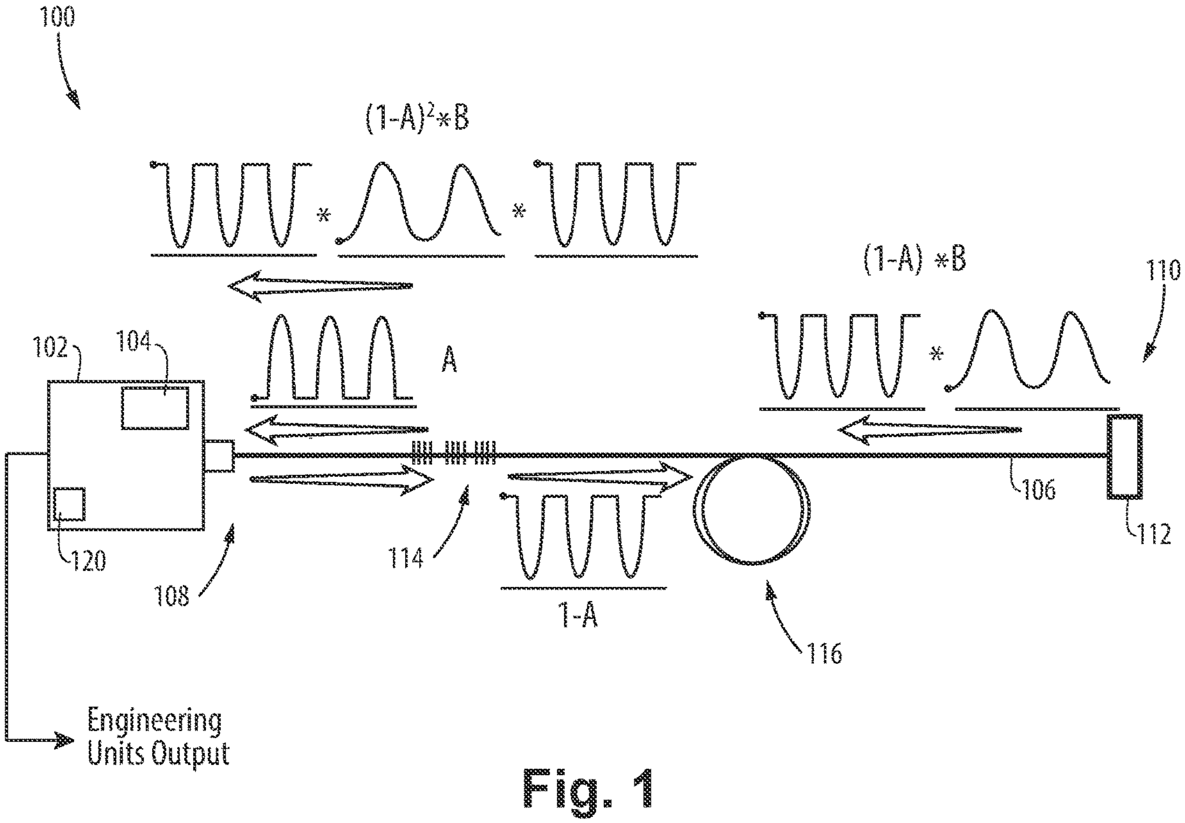
FIG. 1 is a schematic view of an embodiment of a system constructed in accordance with the present disclosure, showing the interrogator, the single optic fiber, and the optical sensor; and fiber Bragg gratings (FBGs) of the fiber.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to receive the calibration coefficient data along with sensor measurement data from a single optical channel (e.g., a single photodetector).

The system 100 includes an interrogator 102 including an illuminator 104. A single optic fiber 106 has a length between a first end 108 and a second end 110. The first end 108 is operatively connected to the illuminator 104 for transmitting illumination along the length of the optic fiber 106. An optical sensor 112 is operatively connected to the second end 110 for reflecting sensor returns of the illumination back along the length of the optic fiber 106 to the interrogator 102. A set of fiber Bragg grating (FBGs) 114 is formed in the optic fiber 106 between the first end 108 and the optical sensor 112. The FBGs 114 are configured for reflecting FBG returns of the illumination back the relatively short distance along the optic fiber 106 to the interrogator 102 optically connected to the first end 108. A delay span 116 is included in the optic fiber 106 between the FBGs 114 and the optical sensor 112. The delay span 116 can be arranged in a coil or other routing of a length of the optic fiber 106.

The interrogator 102 is operatively connected to the first end 108 of the optic fiber 106 to receive the sensor returns B and the FBG returns A from the optic fiber 106. The delay span 116 has a length along the fiber 106 that is configured to create a delay between when the interrogator 102 receives the FBG returns A and when the interrogator 102 receives the sensor return B. The interrogator 102 can convert a combination of the FBG returns A and the sensor returns B into engineering units. The combined FGB returns A and sensor returns B arrive at the interrogator 102 as a combined signal $(1-A)^2*B$, wherein the 1, the A, and the B are all normalized values. The interrogator 102 can output the engineering units as actionable output 118 indicative of a measurement of a measurand at the optical sensor. The actionable output 118 can be displayed visually or communicated audibly to an end user through a user interface, or can be issued, e.g. as digital feedback to a control system for controlling physical behavior, e.g. of an aircraft engine or other onboard system, based on feedback indicative of the measurand. The engineering units can be units for mechanical strain, temperature and/or pressure.

The interrogator 102 has a CPU 120 with a speed and a clock cycle, wherein the speed of the CPU is inverse of the clock cycle. The interrogator 102 and the optic fiber 106 are correlated to one another in that the delay span 116 has a length that is long enough to delay the sensor returns A from the optical sensor 112 to arrive at the interrogator after the FBG returns A by at least a span of time of two times the clock cycle of the CPU 120. The interrogator 102 is configured to preform methods as disclosed herein, e.g. by including machine readable instructions, solid state logic, analog circuitry, or the like, configured to cause the interrogator to perform the methods.

The optical sensor 112 includes a Fabry-Perot interferometer, and the illuminator 104 includes a tunable laser. The interrogator 102 is operatively connected to control the tunable laser to interrogate the optical sensor 112 over a series of differing illumination wavelengths. The interrogator 102 is configured to receive the FBG returns A and the sensor returns B for each of the differing illumination wavelengths to form the engineering units as output, as further described below with reference to FIG. 2.

The FBGs 114 are configured to include encoded data. The interrogator 102 is configured to decode the encoded data based on the FBG returns A. The encoded data includes calibration coefficient data for the optical sensor, among potentially other types of data. The interrogator 102 uses the coefficient calibration data in converting the sensor returns B into the engineering units. More specifically, the interrogator 102 is configured to use the coefficient calibration data in converting the combination of the FBG returns and the sensor returns, i.e. $(1-A)^2*B$, into the engineering units.

The interrogator 102 separates coefficient calibration data from optical sensor data. This includes measuring the FBG returns A arriving at the interrogator 102 before the sensor returns B due to the length the delay span 116. The method includes measuring a combination, i.e. $(1-A)^2*B$, of the sensor returns B and the FBG returns A at some time after first measuring of the FBG returns A arriving before the sensor returns B. When the sensor returns B arrive, they have had to pass through the FBGs 114, so the interrogator 102 actually receives the sensor returns B combined together with the FBG returns A as a combined return $(1-A)^2*B$. The interrogator 102 corrects to isolate the sensor returns B from the combined return $(1-A)^2*B$. This correcting includes saving the measured FBG returns A obtained at the interrogator 102 before the sensor returns A arrive, and using the saved FBG returns A to isolate the sensor returns B from the combined return $(1-A)^2*B$.

The optic fiber 106 is connected to a single channel of the interrogator 102, so the sensing and calibrating can be performed on a single optical channel. Calibration coefficient data is encoded in the FBGs 114 whose reflections are separated in wavelength space from one another. Spacings between consecutive FBGs 114 in wavelength space can represent two ON bits separated by some number of OFF bits corresponding to the spacings. A single FBG of the FBGs 114 can denote a start of encoding which allows a first bit to be an OFF bit. All the FBGs 114 are strain isolated and are configured to be isothermal with one another, ensuring that their spacing remains constant even as their central wavelength changes. The resulting bits can be used to derive one or multiple coefficients, i.e. calibration coefficients for converting data in the sensor returns B into the engineering units. The coefficients can be encoded in a number of ways including unsigned integers, two's compliment, floating point, or the like.

With reference now to FIG. 2 (where reference numbers continue to refer to FIG. 1), the interrogator 102 receives the reflection from the FBGs 114, then sometime after traveling past the FBGs 114 and through the length of fiber 106, the light that was transmitted through the FBGs 114 encounters the optical sensor 112. The reflection from the optical sensor 112 will then return through the length of fiber 106, back through the FBGs 114 and received by the interrogator 102. Assuming the length of fiber 106, i.e. including the delay span 116, separating the FBGs 114 from the optical sensor 112 is sufficiently long, the time ΔT between the initial FBG reflection and the time when optical sensor reflection (coupled with the FBG transmittance) is received by the interrogator 102 is be greater than at least two CPU clock cycles. In other words, the first return from the optical sensor 112 arrives ΔT after the first return from the FBGs 114, wherein ΔT is at least two CPU clock cycles worth of time. Therefore, the intensity after one CPU clock t_0+c (assuming the length of fiber between the interrogator 102 and FBGs 104 is relatively small), will be the intensity from the FBG reflection A and the intensity at time t_0+ΔT will be the intensity of the FBG reflection A plus the intensity of the optical sensor reflection multiplied by the square of the FBG transmittance intensity $(1-A)^2*B$. After the optical sensor measurement is received and computed, the tunable laser of the illuminator 104 lases to the next wavelength. When the next wavelength (Meas #1 in FIG. 2) of light is emitted and reflected from the FBGs 114, the interrogator 102 is still receiving the optical sensor reflection associated with the previous wavelength (Meas #0 in FIG. 2). This value can be estimated based on previous measurements and removed to obtain the FBG reflection A'. The derivations for the FBG and Optical Sensor measurements for three wavelengths (Meas #0, 1, and 2) can be found in FIG. 2 in the Derived Measurements column. Due to losses in the fiber 106 and in the optical sensor 112, error will accumulate while deriving successive measurements. Therefore, it is beneficial to periodically turn off the laser thus clearing the error starting with the pure 'A' reflection again. After interrogating the optical sensor for a series of differing wavelengths, the interrogator 102 can reset cumulative error by shutting off the laser for a sufficient time to clear the sensor returns and start interrogating the optical sensor 112 for another series of differing wavelengths.

The FBGs 114 are inscribed such that the spacing between FBGs 114 in wavelength space encodes one or more coefficients. A single FBG represents an 'on' bit while the spacing between consecutive FBGs 114 represents some number of 'off' bits. The waveband that the coefficient encoding utilizes is known so that the number of trailing 'off' bits after the final FBG can be inferred. A single reference FBG can be encoded to denote the start of the calibration coefficient data such that the spacing between the reference FBG and the first coefficient FBG represent some number of leading "off" bits.

Systems and methods as disclosed herein provide potential benefits including the following. They can provide the ability to convert optical signal indicators into engineering units such as temperature, strain, and pressure without storing calibration coefficient data in a central location.

This allows sensors to be added and replaced without additional software or database updates to the optical interrogator system. This can also allow calibration coefficient data and optical sensor data to be derived using the same optical channel.

The methods and systems of the present disclosure, as described above and shown in the drawings, provide for receiving calibration coefficient data along with sensor measurement data from a single optical channel (e.g., a single photodetector). While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:

an illuminator having a tunable laser;

an optic fiber having a length between a first end of the optic fiber and a second end of the optic fiber, wherein the first end is operatively connected to the illuminator for transmitting illumination from the illuminator along the length of the optic fiber;

an optical sensor operatively connected to the second end for reflecting sensor returns of the illumination back along the length of the optic fiber;

a set of fiber Bragg grating (FBGs) formed in the optic fiber between the first end and the optical sensor, wherein the FBGs are configured for reflecting FBG returns of the illumination back along the optic fiber to the first end, wherein the FBGs are configured to include encoded data, including calibration coefficient data for the optical sensor, and wherein the interrogator is configured to decode the encoded data based on the FBG returns;

a delay span in the optic fiber between the FBGs and the optical sensor; and an interrogator operatively connected to the first end for interrogating the optical sensor over a series of differing illumination wavelengths and for receiving the sensor returns and the FBG returns from the optic fiber for each of the differing illumination wavelengths with at least a portion of the sensor returns and the FBG returns associated with the differing illumination wavelengths being received simultaneously, the interrogator having a CPU with a speed and a clock cycle, wherein the speed of the CPU is inverse of the clock cycle, wherein the delay span has a length along the fiber that is configured to create a delay of at least two clock cycles between when the interrogator receives the FBG returns and when the interrogator receives the sensor returns, thereby delaying the sensor returns with respect to the FBG returns, the interrogator further configured to isolate the sensor returns based on the FBG returns, wherein the interrogator is configured to convert a combination of the FBG returns and the sensor returns into engineering units as output indicative of a measurement of a measurand at the optical sensor.

2. The system as recited in claim 1, wherein the optical sensor includes a Fabry-Perot interferometer.

3. The system as recited in claim 1, wherein the interrogator is configured to receive the FBG returns and the sensor returns for each of the differing illumination wavelengths to form the engineering units as output.

4. The system as recited in claim 1, wherein the engineering units are mechanical strain, temperature and/or pressure.

5. The system as recited in claim 1, wherein the interrogator is configured to use the coefficient calibration data in converting the sensor returns into the engineering units.

6. The system as recited in claim 1, wherein the interrogator is configured to use the calibration coefficient data in converting the combination of the FBG returns and the sensor returns into the engineering units.

7. The system as recited in claim 6, wherein the interrogator is configured to perform a method for separating calibration coefficient data from optical sensor data, wherein the method includes:

measuring the FBG returns arriving at the interrogator before the sensor returns due to the length the delay span;

measuring a combination of the sensor returns and the FBG returns at some time after the measuring of the FBG returns arriving before the sensor returns; and correcting to isolate the sensor returns from the combination of the sensor returns and the FBG returns, wherein the correcting includes using the measuring of the FBG returns arriving at the interrogator before the sensor returns to isolate the sensor returns.

8. The system as recited in claim 7, wherein the optic fiber is connected to a single channel of the interrogator, wherein the calibration coefficient data is encoded in the FBGs whose reflections are separated in wavelength space, wherein spacings between consecutive FBGs in wavelength space represent two ON bits separated by some number of OFF bits corresponding to the spacings, wherein a single FBG of the FBGs denotes a start of encoding which allows a first bit to be an OFF bit, and wherein all the FBGs are strain isolated and are configured to be isothermal with one another.

9. The system as recited in claim 1, wherein the interrogator is configured to receive sensor returns of a first of the differing illumination wavelengths then subsequently and simultaneously receiving FBG returns of a second of the different illumination wavelengths.

10. A method comprising:

illuminating a first end of an optic fiber with a series of differing illumination wavelengths, wherein illumination is first incident upon a set of fiber Bragg gratings (FBGs), then passes through a delay span of fiber, then reflects off of an optical sensor at a second end of the optic fiber;

receiving, for each respective differing illumination wavelength, FBG returns reflected from the FBGs at the first end of the optic fiber before arrival at the first end of sensor returns reflected from the optical sensor, wherein the FBGs are configured to include encoded data, including calibration coefficient data for the optical sensor, and wherein the interrogator is configured to decode the encoded data based on the FBG returns;

receiving combined returns comprising the FBG returns and the sensor returns with at least a portion of the FBG returns and the FBG returns associated with the differing illumination wavelengths being received simultaneously;

isolating the sensor returns based on the FGB return;

converting a combination of the FBG returns and the sensor returns into engineering units indicative of a measurement of a measurand at the optical sensor; and outputting the engineering units.

11. The method as recited in claim 10, wherein the delay span has a length that is long enough to delay the sensor returns from the optical sensor to arrive at the first end after the FBG returns by at least a span of time of two times a clock cycle of a CPU operatively connected to the first end.

12. The method as recited in claim 10, wherein the optical sensor includes a FabryPerot interferometer, the illumination is produced by an illuminator that includes a tunable laser, and further comprising:

controlling the tunable laser to interrogate the optical sensor over the series of differing illumination wavelengths.

13. The method as recited in claim 12, wherein the engineering units are mechanical strain, temperature and/or pressure.

14. The method as recited in claim 13, further comprising:

decoding the encoded data to obtain the calibration coefficient data based on the FBG returns; and using the calibration coefficient data in converting the sensor returns into the engineering units.

15. The method as recited in claim 14, wherein using the calibration coefficient data includes using the calibration coefficient data in converting the combined returns into the engineering units.

16. The method as recited in claim 15, further comprising separating calibration coefficient data from optical sensor data, including:

measuring the FBG returns arriving at the first end of the fiber before the sensor returns due to the length the delay span;

measuring a combination of the sensor returns and the FBG returns at some time after the measuring of the FBG returns that arrived before the sensor returns; and correcting to isolate the sensor returns from the combination of the sensor returns and the FBG returns, wherein the correcting includes using the measuring of the FBG returns arriving at the interrogator before the sensor returns to isolate the sensor returns.

17. The method as recited in claim 16, wherein the optic fiber is connected to a single channel of an interrogator, wherein the calibration coefficient data is encoded in the FBGs whose reflections are separated in wavelength space, wherein spacings between consecutive FBGs in wavelength space represent two ON bits separated by some number of OFF bits corresponding to the spacings, wherein a single FBG of the FBGs denotes a start of encoding which allows a first bit to be an OFF bit, and wherein all the FBGs are strain isolated and are configured to be isothermal with one another, and further comprising using bits from the FBGs to derive one or multiple calibration coefficients.

18. The method as recited in claim 17, further comprising after interrogating the optical sensor for the series of differing wavelengths, resetting cumulative error by shutting off the laser for a sufficient time to clear the sensor returns and start interrogating the optical sensor for another series of differing wavelengths.

19. The method as recited in claim 10, wherein the step of receiving combined returns comprises receiving sensor returns of a first of the differing illumination wavelengths then subsequently and simultaneously receiving FBG returns of a second of the different illumination wavelengths.

* * * * *